June 28, 1966     M. E. SIEFFERMAN     3,257,861
GEAR SHIFTER FORK ASSEMBLY
Filed June 15, 1964

Inventor
Marvin E. Siefferman
By Charles L. Schurst
Attorney

United States Patent Office 3,257,861
Patented June 28, 1966

3,257,861
GEAR SHIFTER FORK ASSEMBLY
Marvin E. Siefferman, Springfield, Ill., assignor to Allis-Chalmers Manufacturing Company, Milwaukee, Wis.
Filed June 15, 1964, Ser. No. 375,133
7 Claims. (Cl. 74—473)

This invention relates to shifter fork construction for shifting gears and the like and particularly to provision of a readily replaceable insert which extends the life of the fork and mating shiftable transmission element and permits inexpensive renewal of the fork assembly.

Heretofore, special wear resisting material such as bronze has been fused to the axially opposite thrust faces of a gear shifter fork in an attempt to reduce wear of the fork and mating annular flanges of a gear or shift collar. Also heretofore special facing material has been riveted to shifter forks for the same purpose. These prior constructions have not proven successful in transmissions of crawler tractors for instance. The fused on facing wears at an excessively rapid rate and after some wear the rivets of the riveted on facing construction may loosen. This results in wear particles which effects rapid grinding wear of the facings.

It is an important object of this invention to provide a shifter fork assembly having improved operating life.

It is a further object of this invention to provide a replaceable insert for a shifter fork which is not secured rigidly or permanently to the fork.

It is a further object of this invention to provide a shifter fork assembly using the insert outlined in the previous object and wherein abutment means are provided on the fork and insert to prevent relative rotation.

It is a further object of this invention to provide a shifter fork assembly having a relatively loose fitting axial thrust bearing insert whereby substantially full bearing surface contact is effected between the relatively rotating parts even though slight misalignment occurs between the fork and shifted element.

It is a further object of this invention to provide a shifter fork assembly for shifting a rotating power transmitting element relative to its support wherein an arcuate insert having a pair of axially spaced walls is rigidly interconnected by a bridging wall which fits into a notch in the fork to thereby prevent relative rotation between the insert and fork.

These and other objects and advantages of this invention will be apparent to those familiar with the art when the following description is read in conjunction with the drawings in which.

Figure 1:
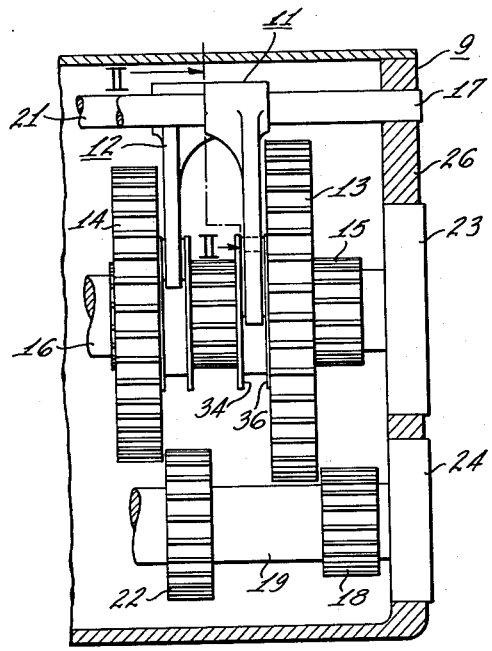
FIG. 1 is a section view of a sliding gear transmission showing a pair of shifter fork assemblies using my invention.

In the transmission 9 of FIG. 1, the shifter fork assemblies 11, 12 are employed to shift rotatable power transmitting elements in the form of sliding spur gears 13, 14 axially along a splined portion 15 of their support or shaft 16. When the operator shifts rod 17 to the right, as shown in FIG. 1, the shifter fork assembly 11, which is rigidly secured to rod 17, shifts gear 13 into meshing relation with gear 18 on countershaft 19. Similarly when rod 21 is shifted to the right shifter fork assembly 12 slides gear 14 into mesh with gear 22 on countershaft 19. The shafts 16, 19 are journaled in bearings 23, 24 in a wall of the transmission housing 26.

Figure 2:
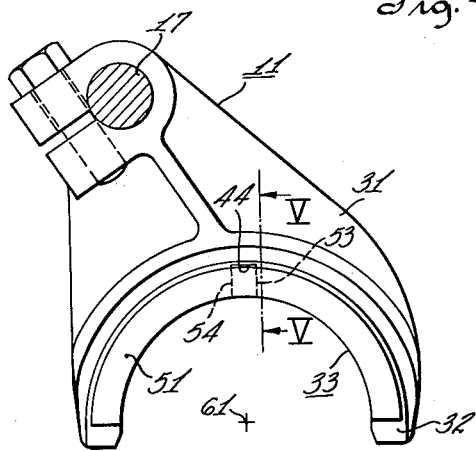
FIG. 2 is a section view taken along the line II—II in FIG. 1 and showing my shifter fork assembly.
Figure 4:
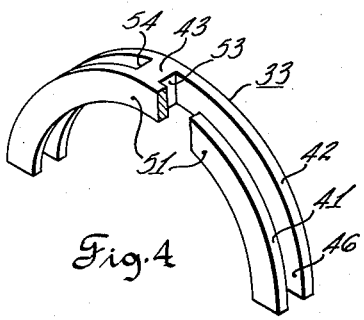
FIG. 4 is a perspective view of the insert with a portion of one of its walls broken away.
Figure 3:
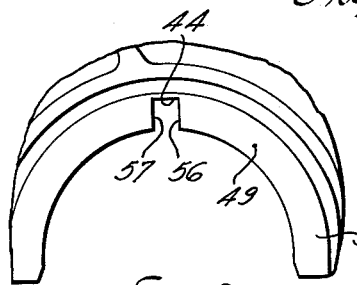
FIG. 3 is a view similar to FIG. 2 but with the replaceable insert removed.
Figure 5:
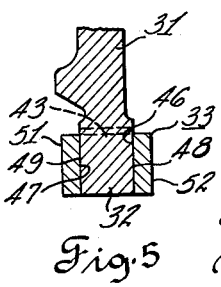
FIG. 5 is a section view taken along the line V—V in FIG. 2.

Referring also to FIGS. 2 and 3, the shifter assembly 11 includes a fork 31 with a semicircular portion in the form of an arcuate flange 32 and an arcuate insert 33 freely fitting on flange 32. In prior shifter fork constructions excessive fork wear has been experienced under some operating conditions. This excessive wear may be due to a number of factors including shaft deflection causing concentrated loading on areas of the shifter fork and mating thrust surfaces of the shifted element, such as radial surfaces 34, 36 on gear 13. The concentrated loading results when the axial thrust surfaces of the shifter fork are not coplanar with the thrust surfaces on the shifted element. By constructing the insert 33 and fork 31 to provide a relatively loose fit therebetween, markedly improved wear characteristics are obtained as compared to constructions wherein facing material is fused to the fork or facings are rigidly secured as by riveting to the fork. Preferably the insert 33 is made of bronze.

Referring to FIGS. 2 through 5, the insert 33 has a pair of axially spaced walls 41, 42 rigidly interconnected by wall means in the form of a bridge 43 which has a loose fit in a notch 44 in the flange 32. The insert walls 41, 42 present thrust faces 46, 47, complementary to and engageable with thrust surfaces 48, 49 on axially opposite sides of flange 32. The flat axially outward facing bearing surfaces 51, 52 on walls 41, 42 of insert 33 are adapted to have flat surface engagement with surfaces 34, 36, respectively, on gear 13.

Abutment surfaces 53, 54 on the insert bridge 43 cooperate with abutment surfaces 56, 57, which in part define notch 44, to prevent relative rotation between the insert and fork. Placing the notch 44 intermediate the circumferentially opposite ends of flange 32 does not excessively weaken the fork.

From the foregoing description it is apparent that I have provided a novel and useful shifter fork assembly. The bronze insert is easily installed by movement thereof transverse to axis 61 of the arcuate flange 32, which preferably is the axis of shaft 16. The loose fit of the insert has been found to give highly superior life as compared to prior constructions. The insert 33 is simple in configuration so that it is inexpensive to manufacture. The bridge 43 not only rigidly joins the two walls 41, 42 but also constitutes abutment means for cooperation with notch 44 to prevent relative rotation.

The embodiments of the invention for which an exclusive property or privilege is claimed are defined as follows:

1. A shifter assembly for shifting a rotatable power transmitting element axially along its support, comprising:
   a fork having a semicircular portion with axially spaced and radially extending thrust surfaces,
   an insert freely fitting on said semicircular portion and having axially spaced semicircular walls with
   thrust faces on said walls, respectively, complementary to and engageable with said thrust surfaces, and
   flat axially spaced bearing surfaces on said walls, respectively, extending radially at right angles to the axis of said semicircular portion, and
   abutment surfaces on said fork and insert, respectively, in circumferentially confronting relation to one another and operative when said insert is installed on said semicircular portion to prevent rotation of said insert relative to said fork.

2. The structure set forth in claim 1 wherein said insert includes wall means rigidly interconnecting said walls and wherein said abutment surfaces on said insert are on said wall means.

3

3. The structure set forth in claim 2 wherein said semicircular portion has a notch intermediate its circumferentially opposite ends defined at least in part by said abutment surfaces on said yoke.

4. A shifter assembly for shifting a rotatable power transmitting element axially along its support, comprising:
- a fork having a semicircular portion with axially spaced and radially extending thrust surfaces,
- a relatively loose fitting insert installable on and removable from said semicircular portion by movement transversely to the axis of the latter and having axially spaced and rigidly interconnected semicircular walls with
- thrust faces on said walls, respectively, complementary to and engageable with said thrust surfaces, and
- flat axially spaced semiannular bearing surfaces on said walls, respectively, extending radially at right angles to said axis, and
- abutment surfaces on said fork and insert, respectively, in circumferentially confronting relation to one another and operative when said insert is installed on said semicircular portion to prevent rotation of said insert relative to said fork.

4

5. The structure set forth in claim 4 wherein said semicircular walls of said insert are rigidly interconnected by an axially extending bridge constituting an integral part of said insert and said abutment surfaces on said insert are formed on said bridge.

6. The structure set forth in claim 5 and further comprising a notch in said semicircular portion defined at least in part by said abutment surfaces formed on said fork and wherein said bridge fits in said notch when said fork and insert are in assembly.

7. The structure set forth in claim 4 wherein said semicircular portion is an arcuate flange and said thrust surfaces are on axially opposite sides of said flange.

References Cited by the Examiner
UNITED STATES PATENTS

| | | | |
|---|---|---|---|
| 1,825,979 | 10/1931 | Reed | 192—98 |
| 1,991,562 | 2/1935 | Lucas | 308—165 |

MILTON KAUFMAN, *Primary Examiner.*

J. D. PUFFER, *Assistant Examiner.*